United States Patent [19]
Glover

[11] Patent Number: 5,181,765
[45] Date of Patent: Jan. 26, 1993

[54] HEAT TREATED LATCH PLATE
[75] Inventor: Richard W. Glover, Troy, Ohio
[73] Assignee: Lisco, Inc., Tampa, Fla.
[21] Appl. No.: 663,503
[22] Filed: Mar. 1, 1991
[51] Int. Cl.⁵ .................. A44B 11/25; B60R 21/00
[52] U.S. Cl. .................... 297/467; 24/642; 297/250; 297/472; 297/488
[58] Field of Search .............. 24/642; 297/250, 471, 297/472, 467, 488; 148/902

[56] References Cited

U.S. PATENT DOCUMENTS

| | | | |
|---|---|---|---|
| 1,554,336 | 9/1925 | Lapotterie | 148/902 |
| 1,963,403 | 6/1934 | Daniels | 148/902 |
| 3,790,209 | 2/1974 | Littmann | 297/483 |
| 4,342,483 | 8/1982 | Takada | 297/250 |
| 4,385,424 | 5/1983 | Petersen, III | 24/633 |
| 4,392,280 | 7/1983 | Gavagan | 24/637 |
| 4,431,466 | 2/1984 | MeLampy | 148/902 |
| 4,457,251 | 7/1984 | Weman et al. | 297/472 |
| 4,632,460 | 12/1986 | Meeker et al. | 297/467 |
| 4,826,246 | 5/1989 | Meeker | 297/250 |
| 5,022,669 | 6/1991 | Johnson | 297/467 |

Primary Examiner—Laurie K. Cranmer
Assistant Examiner—Cassandra L. Hope

[57] ABSTRACT

A child's car seat comprising a rigid frame having back, bottom, and side portions and a buckle located therein; strap means extending from the back over the shoulders of a child occupant of the seat; and a T-shield secured to the lower ends of the straps. Also included is a latch plate, the latch plate having an upper portion with an opening adapted to receive the straps and a lower portion with a locking aperture to be releasably secured in the buckle, the upper portion of the latch plate being of a first rigidity and being encompassed and secured within the T-shield and the lower portion of the latch plate being heat treated to render it more rigid than the upper portion.

5 Claims, 2 Drawing Sheets

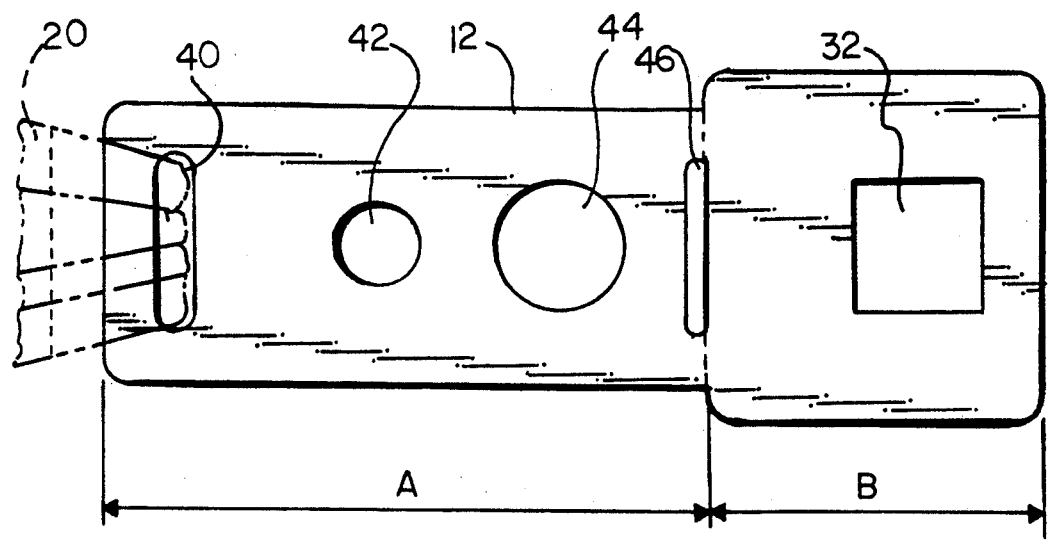
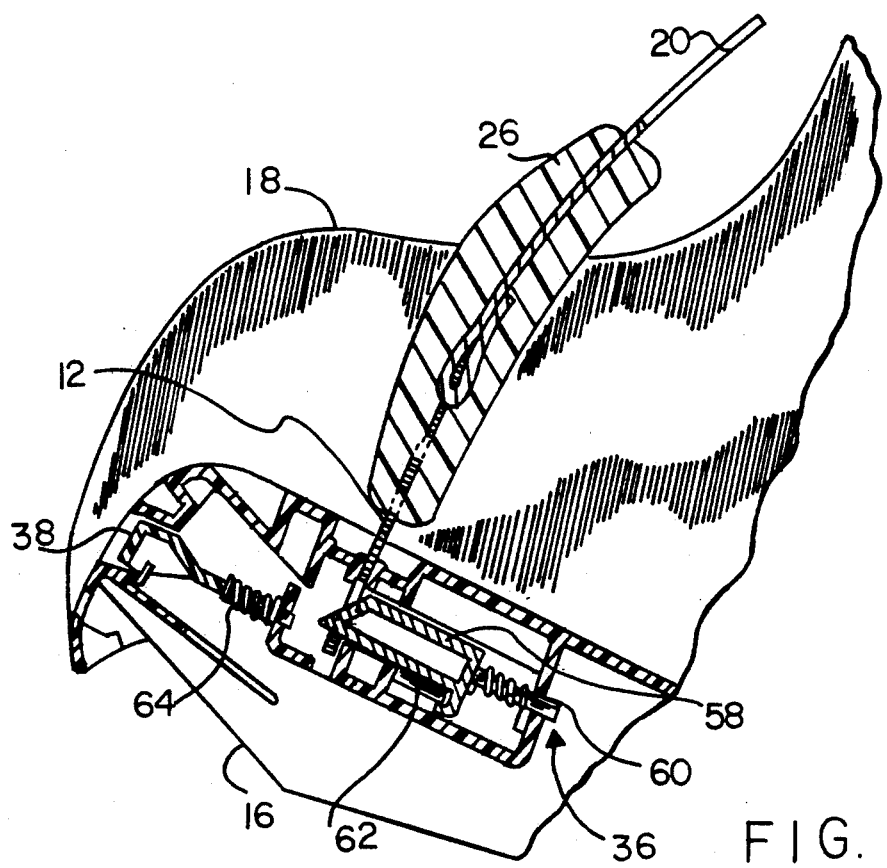

HEAT TREATED LATCH PLATE

BACKGROUND OF THE INVENTION

1. Summary of the Invention

This invention relates to a heat treated latch plate or tongue and, more particularly, to a child's car seat with a T-shield wherein the leading portion of the latch plate is heat treated.

2. Summary of the Background Art

A variety of child car seats have been developed for increasing the safety of children in cars. The most common type of child car seat is one which rests on the vehicle seat and is releasably coupled thereto through the seat belt of the car. Conventional child car seats generally consist of a rigid plastic shell and a padded cover which is provided with its own restraint belt system. Such belt system normally includes a pair of shoulder belts which are adjustable to accommodate the size of the child. The shoulder belts extend downwardly from the shell, across the child, and terminate in a short latch plate or tongue which is releasably received by a buckle fixedly located in the car seat.

A recent advance in child car seats is the use of a T-shield located at the lower ends of the shoulder belts. An elongated latch plate is secured within the lower end of the T-shield. The latch plate is normally fabricated of a rigid material, as for example, a carbon steel. The upper end is fixedly secured within the rigid T-shield while the lower end is provided with a locking aperture for being releasably received by a fixed buckle located in the car seat. The buckle has a release button under the control of a parent or other adult charged with the safety of the child.

It has been found that when latch plates are constructed of a moderately rigid material, as for example a carbon steel which has not been heat treated for increased rigidity, such latch plate can distort under the impact of a crash. When distorted, the latch plate may escape the securement of the buckle and allow the child to be thrown from the seat thereby resulting in injuries. In the alternative, a distorted latch plate may be excessively difficult to separate from the buckle thereby precluding child removal. When, however, the latch plate is entirely heat treated for increased rigidity throughout its entire extent, the impact of a crash may cause a higher degree of load to be transferred to the child, once again increasing the probability of injury to the child.

Various techniques and devices are employed commercially or are disclosed in the patent literature for constituting latch plates for child's car seats. Most of the older types include a lower portion with an aperture for being received by a buckle in combination with a short upper portion with a slot for receiving the shoulder belts. By way of example, note U.S. Pat. Nos. 3,938,859; 4,196,500; 4,301,576; 4,375,714; 4,425,688; 4,566,161; 4,617,705; 4,675,956; 4,733,444 and 4,797,984.

In contrast to the above listed older types of latch plates, newer latch plates have elongated upper portions for being secured with T-shields. Note U.S. Pat. No. 4,342,483 to Takata and U.S. Pat. No. 4,632,460 to Meeker. In these later two patents, however, there is no disclosure with respect to the selective heat treating of only certain portions of the latch plate. It can be assumed, consequently, that the entire latch plate is heat treated, if at all, throughout its entire extent.

As illustrated by the great number of prior patents as well as other commercial devices and techniques, efforts are continuously being made in attempt to improve child car seats and their latch plates. Such efforts have been made to render such devices more safe, reliable, efficient, inexpensive and convenient to use. None of these previous efforts, however, provides the benefits attendant with the present invention. Additionally, the prior patented and commercial devices and techniques do not suggest the present inventive concepts as disclosed and claimed herein.

The present invention achieves its intended purposes, objects and advantages through a new, useful and unobvious combination of component elements, with the use of a minimum number of functioning parts, at a reasonable cost to manufacture, and by employing only readily available materials and techniques.

Accordingly, it is an object of the present invention to provide a child's car seat comprising a rigid frame having back, bottom, and side portions and a buckle located therein; strap means extending from the back over the shoulders of a child occupant of the seat; a T-shield secured to the lower ends of the straps; and a latch plate, the latch plate having an upper portion with an opening adapted to receive the straps and a lower portion with a locking aperture to be releasably secured in the buckle, the upper portion of the latch plate being of a first rigidity and being encompassed and secured within the T-shield and the lower portion of the latch plate being heat treated to render it more rigid than the upper portion.

It is a further object of the present invention to heat treat the lower portion of a latch plate of a T-shield to render it more rigid and less susceptible to distortion during a crash.

It is a further object of the invention to improve the safety of child car seats by rendering the upper portions of T-shields more flexible than their lower portions.

Lastly, it is a further object of the invention to preclude jamming of a latch plate units buckle after a crash.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with specific embodiment shown in the attached drawings. For the purpose of summarizing this invention, the invention may be incorporated into an improved child's car seat comprising a rigid frame having back, bottom, and side portions and a buckle located therein; strap means extending from the back over the shoulders of a child occupant of the seat; a T-shield secured to the lower ends of the straps; and a latch plate, the latch plate having an upper portion with an opening adapted to receive the straps and a lower portion with a locking aperture to be releasably secured in the buckle, the upper portion of the latch plate being of a first rigidity and being encompassed and secured within the T-shield and the lower portion of the latch plate being heat treated to render it more rigid than the upper portion.

The lower portion of the latch plate has a Rockwell hardness of between about 45 and 48 on the C scale. The upper portion of the latch plate has a Rockwell hardness of less than 45 on the C scale.

The invention may also be incorporated into an improved latch plate for use in a T-shield of a child's car seat, the latch plate having an upper portion constituting the majority of its length and being formed with openings along its axis, the uppermost opening being elongated transverse to the axis for receiving the lower ends of shoulder belts, the latch plate having a lower portion with an aperture adapted to be releasably received by a buckle of the car seat, the latch plate being heat treated at its lower section to render it more rigid than the upper portion with the upper portion remaining more flexible than the lower portion.

The latch plate further includes a slot between the upper and lower portions. The upper portion constitutes the majority of the length of the latch plate. The upper portion constitutes about 65 percent of the length of the latch plate.

The invention may also be incorporated into a method for forming a latch plate comprising the steps of: (1) dipping the lower portion of the latch plate in a heated salt solution; (2) quenching the dipped lower portion in an oil bath; and (3) tempering the quenched lower portion at an elevated temperature.

The dipping is done for about 5 minutes a about 1550 degrees fahrenheit. The quenching is done to bring the dipped lower portion to a Rockwell hardness of 55 or greater on the C scale. The tempering is done at about 575 to 600 degrees for about an hour and a half to bring the lower portion to a Rockwell hardness of about 45 to 48 on the C scale.

The invention may also be incorporated into a method of heat treating a steel latch plate which includes the step of exciting the steel in one portion thereof which corresponds to the portion to be received by a buckle, the exciting may be effected by a radio frequency field or by the selective application of a flame.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed herein may be readily utilized as a basis for modifying or designing other structures for carrying out the same purposes of the present invention. It should also be realized by those skilled in the ar that such equivalent structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 2 is an enlarged sectional view of the T-shield and latch plate region taken along line 2—2 of FIG. 1.

FIG. 3 is a plan view of the latch plate shown in FIGS. 1 and 2.

Similar reference characters refer to similar parts throughout the several views of the drawings.

DETAILED DESCRIPTION OF THE INVENTION

Figure 1:
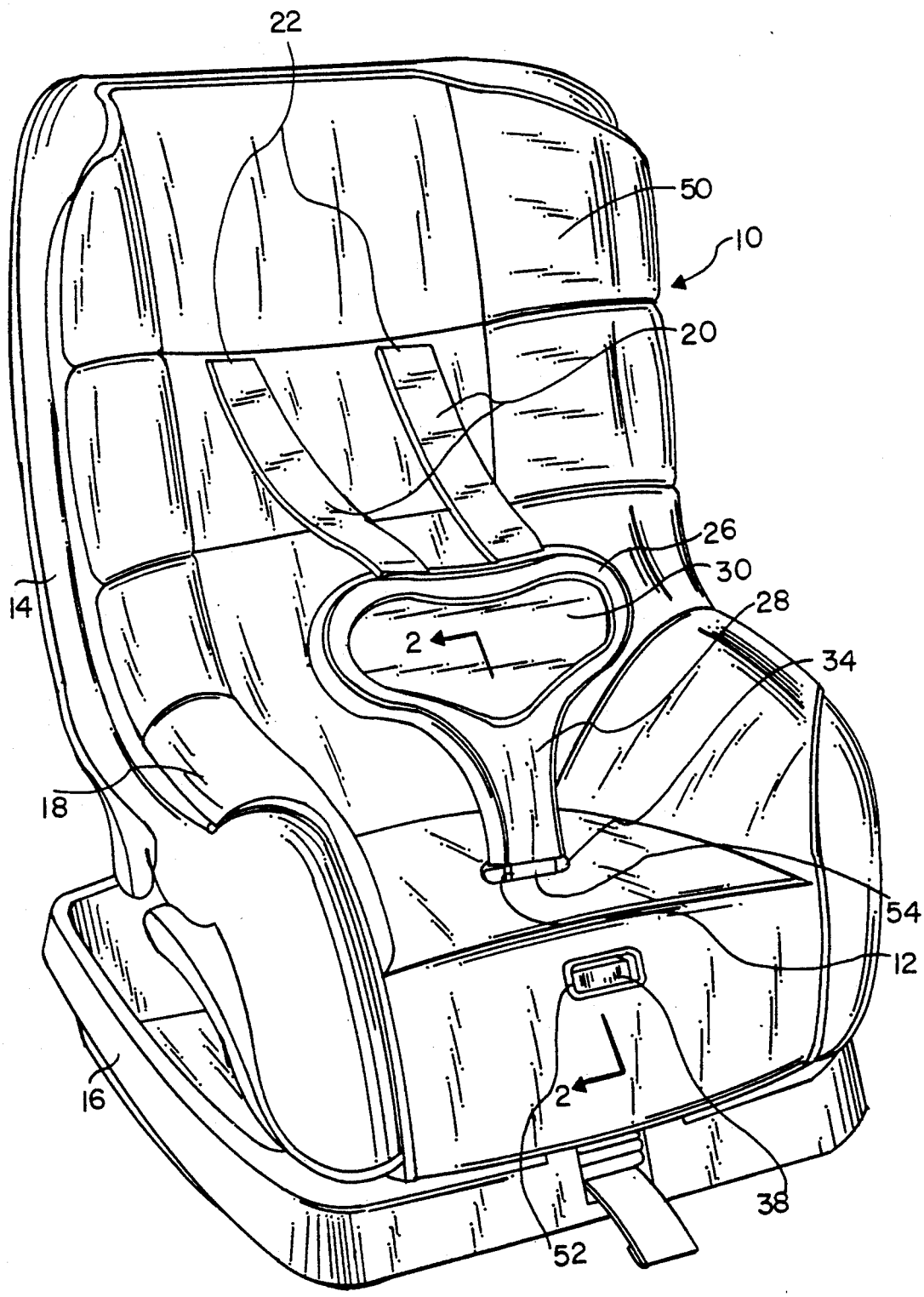
FIG. 1 is a perspective illustration of a child's car employing a T-shield and latch plate constructed in accordance with the principles of the present invention.

An example of a type of child car seat 10 to which the latch plate 12 of the present invention may be applied is that shown in FIGS. 1 and 2. The child car seat is secured to a car or vehicle seat through a conventional seat belt, not shown. The child car seat consists of a unitary, rigid back 14 and bottom 16 with side arms 18. The belt system of the child car seat includes a pair of straps 20 extending from two slots 22 in the back and positioned over the shoulders of the child occupant. The straps are joined to a T-shield 26 which is conventional in construction, shaped in a triangular configuration. The narrow portion 28 of the T-shield passes downwardly between the child's legs for providing protection to the child's crotch while the broad upper portion 30 is for providing protection for the child's chest.

The latch plate 12 extends downward from the lower portion B of the T-shield 26, terminating in a rectangular locking aperture 32. The locking aperture fits into a slot 34 in the car seat for being received and releasably locked into place by a buckle system 36. Release of the buckle 36 is achieved by pressing a spring-biased button 38 at the front edge of the car seat. The upper portion A of the latch plate is of a reduced width and includes an elongated opening 40 for receiving the lower ends of the belts and a plurality of additional openings 42 and 44 which are circular in configuration for being received by the foam material of the T-shield. A central elongated slot 46, transverse to the axis, separates the upper and lower portions and ensures heat treating of the lower portion independent of the upper. It also constitutes a natural bend point in the event of a crash.

The belt assembly consists of a strap 20 extending downwardly from the slots 22 in the back 14 to a common point where it loops around the elongated opening 40 in the uppermost portion of the T-shield 26. There it is stitched for securement. The entire upper portion of the latch plate is molded into the T-shield for permanent securement therewith. A preferred molded material is polyurethane.

FIGS. 1 and 2 show the T-shield being held so that the lower portion B of the latch plate is inserted and held in the slot 34 of the buckle 36 to safely secure a child in the car seat. An enlarged cross section of the buckle is shown in Figure 2. As can be seen, the majority of the length of the latch plate about 65 percent is in the upper portion for increased securement within the T-shield. A longitudinal axis 37 extends centrally along the length of the latch plate 12.

The seat consists of a rigid shell covered by a cushion material 50. The shell and cushion material have an opening 52 along the front edge of the seat. The button 38 by which the buckle is operated is accessible through this opening. This permits the button to be pushed in by a parent for releasing the hold on the latch plate. A gap 54 in the cushion material at the upper surface of the seat provides access to the slot through which the tongue is inserted for being locked by the buckle. The buckle mechanism is of a conventional design in commerce today.

Conventional tongues or latch plates, including those for use in T-shields, are generally constructed of a rigid metallic material such as high carbon steel. The purpose is to minimize bending during adverse circumstances such as a crash. If the tongue is excessively flexible, it will bend during the impact of a crash and thereby allow escape of the latch portion from the buckle. When this occurs, the latch plate is separated from the buckle and the child may be thrown from the car seat and become injured.

Distortion of the latch plate may also cause the release mechanisms to completely or partially jam. This encumbers the proper or expected operation of the releasing mechanisms. This could encumber removal of the child occupant from the child restraint after an accident which causes bending of the latch plate in the buckle. Finding a jammed mechanism after a crash may cause a parent or other good samaritan to abandon the attempted removal of the chid occupant from a potentially hazardous environment. If, however, the latch plate is excessively rigid so that it does not flex during a crash, there will be a higher degree of load on the latch plate during the forces of an accident. Such forces are transferred to the child occupant thereby increasing the probability of injury to the child.

According to the present invention, the lower portion B of the tongue, that portion received within the buckle, is heat treated as by being annealed, first quenched and then tempered to make such portion more rigid than the remainder of the tongue. In this manner, the portion of the tongue within the buckle will not bend during the impact forces of a crash. The tongue will consequently remain properly secured within the buckle to insure that the child occupant continues to be retained in the seat minimizing the chances of injury. In addition, by not having the upper portion of the latch heat treated for increased rigidity, this upper portion not within the buckle will bend during the higher degree of load forces induced by the accident. This will abate the transfer of forces to the child occupant and thereby decrease the possibility of injury.

From a practical consideration, latch plates are normally constructed of a carbon steel which may or may not be completely heat treated to a hardness of about 45 or less on the scale C of Rockwell hardness. According to the present invention, the heat treating process is one where only part B of the tongue, FIG. 3, is first heat treated by partial submersion in a salt bath, oil quenched and then tempered in the conventional manner. Through partially submerging the latch plate, the leading end up to a location short of slot 46, into a heated metallic salt bath for a period of time, only the leading edge will become hardened. After being brought to a critical temperature in the salt bath and then oil quenching, there is a transformation of the microstructure where the carbon and iron molecules link forming a very hard, brittle steel. Then the part is then tempered by exposing it to an elevated temperature which is below the critical temperature, which causes the grain structure to refine and the excessive hardness to be relieved. As the hardness drops, the brittleness is replaced by toughness. In the particular type of tempering for the present invention, the maximum toughness is obtained. This minimizes the potential of catastrophic metal failure when bending occurs at the boundary between the heat treated and the unheat treated portion of the latch plate.

More specifically, the present invention begins with a cold rolled steel with a thickness of about 0.109 inches plus or minus 0.005 inches. The steel is 1055 cold rolled carbon steel with a carbon content of about 0.55 percent. The entire part, after being formed, is shaped and deburred. The front portion B is then dipped in a first salt bath at 1550 degrees fahrenheit for 5 minutes, then oil quenched. The quenching brings it to a Rockwell hardness of 55 or greater on the C scale. A check is made for proper hardness. The parts are placed in a basket for tempering, not tubs which preclude the flow of air therearound. The tempering in the basket effects a loss of hardness. The tempering is at 575 to 600 degrees fahrenheit for one hour and thirty minutes at temperature. Hardness and brittleness are lost while there is a gain in toughness and ductility. The final product after tempering has a Rockwell hardness of between 45 and 48 on the hardened areas. Thereafter the parts are dipped in a conventional rust preventive solution prior to completion. The resulting product is one which has the properties for its intended purpose.

In this manner, each of the portions of the tongue are treated to a hardness for their intended purposes.

In alternate embodiments of the invention, the one end of the steel latch plate is heat treated by alternate methods. In the first alternate method, the portion of the latch plate adapted to be received by the buckle is excited by a radio frequency (RF) field. In yet another embodiment of the invention, the exciting is effected by the selective application of a flame to the area of the steel of the latch plate adapted to be received by the buckle. Techniques for heat treating with a radio frequency field or a selectably applied flame are well known and such techniques may be applied to these alternate embodiments of the invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:
1. A child's car seat comprising
a rigid frame having back, bottom, and said portions and a buckle located therein;
strap means extending from the back over the shoulders of a child occupant of the seat, the strap having lower ends;
a T-shield secured to the lower ends of the straps; and
a unitary metallic latch plate, the latch plate having a longitudinal axis along its length with an upper portion constituting the majority of the length and with an opening transverse to the longitudinal axis receiving the straps, the latch plate also having a lower portion constituting the minor portion of the length with a locking aperture to be releasably secured in the buckle, the upper portion of the latch plate being of a first rigidity and being en compassed and secured within the T-shield and the lower portion of the latch plate being heat treated to render it more rigid than the upper portion.

2. The car seat as set forth in claim 1 wherein the lower portion of the latch plate has a Rockwell hardness of between about 45 and 48 on the C scale.

3. The car seat as set forth in claim 2 wherein the upper portion of the latch plate has a Rockwell hardness of less than 45 on the C scale.

4. The car seat as set forth in claim 1 and further including a slot between the upper and lower portions.

5. The car seat as set forth in claim 1 wherein the upper portion constitutes about 65 percent of the length of the latch plate.

* * * * *